United States Patent
Espina Perez et al.

(10) Patent No.: US 9,119,142 B2
(45) Date of Patent: Aug. 25, 2015

(54) DEVICE AND METHOD FOR DELAY OPTIMIZATION OF END-TO-END DATA PACKET TRANSMISSIONS IN WIRELESS NETWORKS

(75) Inventors: Javier Espina Perez, Eindhoven (NL); Daniel Goergen, Eindhoven (NL); Tim Schenk, Eindhoven (NL); Oscar Garcia Morchon, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 158 days.

(21) Appl. No.: 13/876,183

(22) PCT Filed: Sep. 9, 2011

(86) PCT No.: PCT/IB2011/053940
§ 371 (c)(1),
(2), (4) Date: Mar. 27, 2013

(87) PCT Pub. No.: WO2012/042411
PCT Pub. Date: Apr. 5, 2012

(65) Prior Publication Data
US 2013/0188562 A1    Jul. 25, 2013

(30) Foreign Application Priority Data

Oct. 1, 2010 (EP) .................................. 10185952

(51) Int. Cl.
*H04W 24/00* (2009.01)
*H04W 84/12* (2009.01)
(Continued)

(52) U.S. Cl.
CPC ............... *H04W 40/20* (2013.01); *H04L 1/188* (2013.01); *H04L 1/1887* (2013.01); *H04L 47/10* (2013.01); *H04L 47/14* (2013.01); *H04L 47/28* (2013.01); *H04L 67/04* (2013.01); *H04L 67/125* (2013.01); *H04W 28/0226* (2013.01); *H04L 2001/0097* (2013.01)

(58) Field of Classification Search
USPC .................................. 370/238, 252, 328, 338
See application file for complete search history.

(56) References Cited

U.S. PATENT DOCUMENTS 6,721,537 B1    4/2004   Briesemeister
8,571,415 B1 *  10/2013  Rider et al. .................. 398/175
(Continued)

FOREIGN PATENT DOCUMENTS

EP    1764964 A2   3/2007
EP    1300990 B1   8/2007
(Continued)

OTHER PUBLICATIONS

Romdhani, Lamia, Bonnet, Christian. "A cross-layer on demand routing protocol for delay-sensitive applications." Personal, Indoor and Mobile Radio Communications, 2005, PIMRC 2005, IEEE 16th International Symposium on Sep. 11-14, 2005, vol. 2, pp. 994-998. Berlin.

(Continued)

*Primary Examiner* — Andrew Lee (57) ABSTRACT

For reducing and homogenizing an end-to-end delay of data packet transmissions in a large-scale wireless mesh network, a device, a system and a method are provided for controlling data packet transmission in the wireless network, wherein transmission parameters of an intermediate node are adjusted based on a distance between the intermediate node and a sender node.

15 Claims, 4 Drawing Sheets

(51) Int. Cl.
*H04W 40/20* (2009.01)
*H04L 1/18* (2006.01)
*H04L 12/801* (2013.01)
*H04L 12/841* (2013.01)
*H04W 28/02* (2009.01)
*H04L 29/08* (2006.01)
*H04L 1/00* (2006.01)

(56) References Cited

U.S. PATENT DOCUMENTS

| | | | |
|---|---|---|---|
| 8,639,251 B2 * | 1/2014 | Gunnarsson et al. | 455/437 |
| 2007/0211636 A1 * | 9/2007 | Bellur et al. | 370/238 |
| 2008/0137556 A1 * | 6/2008 | Park et al. | 370/255 |
| 2009/0154395 A1 | 6/2009 | Park et al. | |
| 2009/0240830 A1 * | 9/2009 | Fernandez | 709/232 |
| 2010/0131815 A1 | 5/2010 | Benveniste | |
| 2011/0063996 A1 * | 3/2011 | Ji et al. | 370/254 |
| 2011/0188653 A1 * | 8/2011 | Yao et al. | 380/255 |
| 2013/0155919 A1 * | 6/2013 | Jung | 370/310 |
| 2013/0260809 A1 * | 10/2013 | Nentwig | 455/502 |
| 2014/0044110 A1 * | 2/2014 | Banerjea | 370/336 |

FOREIGN PATENT DOCUMENTS

| | | |
|---|---|---|
| EP | 1940089 A1 | 7/2008 |
| KR | 100832519 B1 | 5/2008 |
| KR | 20090056070 A | 6/2009 |
| WO | 0079721 A2 | 12/2000 |
| WO | 2009071692 A1 | 6/2009 |
| WO | 2011145027 A1 | 11/2011 |
| WO | 2012042426 A1 | 4/2012 |
| WO | 2012042432 A1 | 4/2012 |
| WO | 2012042495 A1 | 4/2012 |

OTHER PUBLICATIONS

Lahane, M.S.R., Bamnote, G.R. "Cross layer design for routing in multi-hop wireless networks" Journal of Computer Networks 2, 2010, 563-568.

Li, Hongkun, Cheng, Yu, Zhou, Chi, Zhuang, Weihua. "Minimizing end-to-end delay: A novel routing metric for multi-radio wireless mesh networks." Infocom 2009, IEEE, pp. 46-54.

Skraba, Primoz, Aghajan, Hamid, Bahai, Ahmad. "Cross-layer optimization for high density sensor networks: Distributed passive routing decisions." Ad-Hoc, Mobile, and Wireless Networks (2004) 630-630.

Romdhani, Lamia, Bonnet, Christian. "A cross-layer feature for an efficient forwarding strategy in wireless adhoc networks." Advanced Information Networking and Applications. 2006, AINA 2006. 20th International Conference on vol. 1 IEEE, 2006, pp. 741-746. Washington, DC.

* cited by examiner

DEVICE AND METHOD FOR DELAY OPTIMIZATION OF END-TO-END DATA PACKET TRANSMISSIONS IN WIRELESS NETWORKS

FIELD OF THE INVENTION

The invention relates to a device, a system and a method for controlling data packet transmissions in a wireless network.

BACKGROUND OF THE INVENTION

Recently, wireless mesh networks attract more and more attention, e.g. for remote control of illumination systems, building automation, monitoring applications, sensor systems and medical applications. In particular, a remote management of outdoor luminaires, so-called telemanagement, becomes increasingly important. On the one hand, this is driven by environmental concerns, since remote control systems or so-called telemanagement systems enable the use of different dimming patterns, for instance as a function of time, weather conditions and season, allowing a more energy-efficient use of the outdoor lighting system. On the other hand, this is also driven by economical reasons, since the increased energy efficiency also reduces operational costs. Moreover, the system can remotely monitor power usage and detect lamp failures, which allows for determining the best time for repairing luminaires or replacing lamps.

Current radio-frequency (RF) based wireless solutions use either a star network topology or a mesh network topology. In a star network, a data collector has a direct communication path to every node in the network. However, this typically requires a high-power/high-sensitivity base-station-like controller placed at a high location (e.g. on top of a building), which makes the solution cumbersome to deploy and expensive. In a mesh network, the plurality of nodes does in general not communicate directly with the controller, but via so-called multi-hop communications. In a multi-hop communication, a data packet is transmitted from a sender node to a destination node via one or more intermediate nodes. Nodes act as routers to transmit data packets from neighboring nodes to nodes that are too far away to reach in a single hop, resulting in a network that can span larger distances. By breaking long distances in a series of shorter hops, signal strength is sustained. Consequently, routing is performed by all nodes of a mesh network, deciding to which neighboring node the data packet is to be sent. Hence, a mesh network is a very robust and stable network with high connectivity and thus high redundancy and reliability.

In the prior art, mesh network transmission techniques can be divided in two groups: flooding-based and routing-based mesh networks. In a flooding-based mesh network, all data packets are forwarded by all nodes in the network. Therefore, a node does not have to make complicated routing decisions, but just broadcasts the data packet. By these means, the technique is quite robust. However, in large networks, the data overhead due to forwarding impacts the overall data rate. Moreover, collisions of data packets are more likely to occur, further reducing the overall performance. Hence, the main problem of this solution is the scalability. Routing-based mesh networks can be further divided into proactive and reactive schemes. In proactive routing-based mesh networks, all needed network paths are stored in routing tables in each node. The routing tables are kept up to date, e.g. by sending regular beacon messages to neighboring nodes to discover efficient routing paths. Although the data transmission is very efficient in such kind of network, the scalability is still low, since in big networks, the proactive update of the routing tables consumes large parts of network resources. Moreover, the routing tables will grow with the scale of the network. In addition, the setup of the network requires time and resources in order to build up the routing tables. Reactive schemes, in contrast, avoid the permanent overhead and large routing tables by discovering routes on demand. They use flooding to discover network paths and cache active routes or nodes. When routes are only used scarcely for single data packets, flooding the data packets instead of performing a route discovery might be more efficient. If routes are kept long enough to avoid frequent routing, reactive schemes degenerate to proactive schemes. An example for a reactive routing-based mesh network is used in ZigBee. However, the main problem of this protocol scheme is still the scalability of the network.

In large-scale multi-hop networks, the number of hops a data packet has to travel is large as compared to a hop distance in small networks. In a large radio frequency telemanagement system comprising thousands of nodes, 20-40 hops are likely to occur. However, the delivery chance of an individual data packet decreases with its hop distance, since with every hop, there is a chance that the data packet gets lost.

Hence, a big disadvantage in common wireless mesh networks is constituted by the very limited network scalability. This is due to the fact that every data packet or message is transmitted multiple times due to the forwarding, whereby the overall network throughput is reduced. Also, data packet collisions are more likely to occur causing data packet losses, further reducing the overall performance. Thus, improving the success and reliability of multi-hop end-to-end transmissions is particularly crucial in large-scale multi-hop networks, such as street illumination systems with a high number of luminaire nodes, since end-to-end retransmissions are far more resource/bandwidth costly and delay intensive than in typical smaller networks. Hence, efficient routing protocols and reduction of end-to-end delays are required for large-scale wireless mesh networks in order to achieve the required throughput, response times and robustness. Moreover, when a data packet is dropped during the final hops to its destination, it has to be retransmitted by its sender node. This causes large delays as well as delay differences in the communication between any two nodes in the network, leading to a poor user experience due to the high and/or heterogeneous delays, e.g. when interacting with the luminaire nodes of an illumination system.

In order to determine whether a data packet is successfully delivered or got lost, data packet transmissions are commonly performed in acknowledgement mode. In a hop-by-hop acknowledgement mode, every hop of the multi-hop transmission is confirmed by the receiving node to the preceding transmitting node. However, this leads to high network load. Thus, often end-to-end acknowledgements are used, wherein the final destination node confirms the receipt of the data packet to the initial sender node. In this mode, the sender node waits for a predetermined time, so-called acknowledgement time-out, before retransmitting the data packet for which it was expecting the acknowledgement. In general, the acknowledgement time-out is fixed and common to all nodes of the network. Since the acknowledgement time-out for data packets travelling a short distance is then the same as for data packets travelling a long distance, the delay of the retransmission is unnecessarily increased for short-travelling data packets, affecting the overall transmission speed of the network. If this disadvantage were addressed by simply reducing the size of the network, scalability would sink further. Therefore, an end-to-end transmission delay of successful data packet delivery as well as transmission delay differences in the network should be minimized.

WO 2009071692 A1 describes a method for characterizing a communication link by considering transmission characteristics of both a MAC layer and a network layer.

EP 1 300 990 B1 describes a method involving transmitting data from a first station via at least a second station to at least one further station. At the interfaces between the stations various data processing requirements are used. The data processing requirements are determined depending on a geographic distance to a defined origin, in particular to a first transmission point. Data processing requirements become less stringent with increasing distance.

KR 2009 0056070 A discloses a method of selecting a relay node by using a competition window in a vehicle ad-hoc network. A source node calculates a competition window including all nodes within transmission range. Each node within the competition window has a message transmission waiting time that is inverse proportional to its distance from the source node. A node whose message transmission waiting time is expired first is selected as a relay node.

U.S. Pat. No. 6,721,537 B1 describes a method for broadcasting a message in an incomplete radio communication network having a fluctuating number of subscribers for forwarding the message. Each subscriber has a transmitting and receiving device for messages and a positioning system for determining its global position. After receiving the message the subscribers determine their own position and the distance from the sender of the message, who is also a subscriber, and transmit the message, with their own position, to further subscribers after a predetermined waiting period, which decreases monotonically as the distance increases.

EP 1 940 089 A1 describes a data transmission method for controlling an arrival delay. A node calculates a cumulative delay of a received packet by using an arrival delay of the packet and a cumulative delay cumulated up to the previous hop. The node then compares the cumulative delay with a target cumulative delay, thereby controlling a transmission profile for the packet so that an expected cumulative delay at the next node becomes closer to a target value. The node writes the cumulative delay in a header of the packet and transmits the packet to the next node using the set transmission profile.

EP 1 764 964 A2 describes a technology that uses a visibility function within a network environment, in particular a vehicular ad-hoc network including a set of nodes. At least one of the nodes can directly transmit to one or more of a subset of the set of nodes. The visibility function characterizes a non-uniform resolution profile within the network environment that extends over at least one node outside the subset of nodes. The sent situation information is conditioned to propagate through the network environment according to the visibility function. The node can also receive situation information that includes a visibility parameter. Once the situation information is received, the node can evaluate the visibility parameter to determine whether the situation information is eligible for continued propagation through the network environment. If the situation information is eligible for continued propagation the node then transmits the situation information.

KR 100 832 519 B1 describes a lighting control system using a wireless tag provided to control a lighting group according to a user position by sensing a lighting control signal of the wireless tag through a second wireless switch and transmitting the signal from the second wireless switch to a first wireless switch through an ad-hoc network.

SUMMARY OF THE INVENTION

In view of above disadvantages and problems in the prior art, it is object of the present invention to provide a device, a system and a method for transmitting data packets in a wireless network that minimize and homogenize an end-to-end retransmission delay, while maintaining or even increasing network scalability.

The object is solved by the features of the independent claims.

The present invention is based on the idea to adjust a probability that a data packet has to be retransmitted based on a distance the data packet has already traveled. By these means, it is possible to minimize the probability that a data packet having already traveled for a large number of hops has to be retransmitted, which would further increase its high delay. Thereby, the total communication delay for long routes can be decreased.

In one aspect of the present invention, a device for a node of a wireless network is provided for controlling a data packet transmission, when the node operates as an intermediate node in a multi-hop data packet transmission. The control unit of the device can adjust transmission parameters for forwarding a received data packet based on a distance that the data packet has already traveled from a sender node. This increases the probability for a long-traveled data packet to survive the final hops before arriving at its destination node.

In one embodiment, the transmission parameters include at least one of a maximum number of retransmissions at a lower protocol layer, a maximum number of medium access attempts, a transmit power level, a delay time for retransmission and a back-off time for medium access attempts. Here, medium access attempt relates to the process of carrier sensing and the subsequent transmitting or retransmitting of a data packet, when the medium is free. Thus, the back-off time for medium access attempts denotes the time interval between subsequent medium access attempts. Likewise, the delay time for retransmission refers to the time between subsequent retransmissions. The transmit power level is related to the signal strength of the transmitted data packet.

In a preferred embodiment, two sets of transmission parameters are predefined, one relating to standard transmission parameters, the other to preferential transmission parameters for accelerated processing or forwarding of the data packet. The transmission parameters may be set to the preferential transmission parameters, it is determined that the distance traveled by the data packet exceeds a certain threshold. Alternatively or additionally, the transmission parameters may be a function of the travel distance of the data packet, so that they are continuously adjusted. Furthermore, a type of the data packet may be considered. For this, the network node or the device may be able to determine the type of the data packet, e.g. whether it is a time-critical or time-uncritical data packet or which priority rank the data packet has. For example, in a street lighting system, data packets reported by the luminaire nodes may have different priorities such as statistical or power status data with low priority as against alarm messages or traffic accident reports with high priority. Preferably, the transmission parameters are adjusted such that a transmission probability of long-traveled data packets during the last hops is increased. Thus, long-traveled data packets will be prioritized on the expense of short-traveled data packets, resulting in a reduced end-to-end-delay for data packet transmissions between distant nodes and in an inherent homogenization of the end-to-end delay in the network. Especially in large-scale luminaire networks, this will have the advantage of synchronized luminaire behavior, e.g. in response to a broadcast dimming command.

Advantageously, the device may be adapted to be added or coupled to an existing node or a control center of the wireless network. Thus, the device is associated with a network node, which may also be a data collector node. The data collector node may be any node that is configured to communicate with a control center of the network and may function as a kind of gateway. For instance, the device may be adapted to be inserted in an existing circuit board or to be connected to an existing controller of the node. This is in particular useful for improving or upgrading an existing system such as a street lighting system. In addition to the control unit, the device may further comprise a memory and/or a transceiving unit for receiving and transmitting data packets.

The wireless network may have mesh topology, wherein each node may act as a router. Such a network has increased redundancy and reliability. The transmission of a data packet from a sender node to a destination node may be performed in a multi-hop mode via at least one intermediate node. Preferably, the nodes of the wireless network are stationary, as it is mainly the case for large outdoor lighting systems. Alternatively or additionally, the positions of at least some nodes may be known to at least some of the other nodes of the network and/or to a control center of the network. For instance, at least some of the nodes may store a routing table for data packet transmission from the respective node to a closest data collector node. Preferably, a routing protocol for data packet transmission to the closest data collector node is based on many-to-one routing. Hence, a data packet is transmitted to the neighboring node that is closer to one of the data collector nodes. By these means, data packet transmission becomes faster and more efficient. Moreover, this also allows to dispense with a multiple data collector nodes in large wireless mesh networks, e.g. in a street lighting system with a number of luminaire nodes exceeding 1000, thereby increasing redundancy and reliability of the network.

In a further embodiment, the distance between two nodes, e.g. the sender node and the intermediate node or the destination node, is defined by a hop distance, a GPS-based distance and/or an Euclidean distance. The hop distance between two nodes may be characterized by the hop count, i.e. the number of hops required for transmitting a data packet between the two nodes, or by the number of intermediate nodes forwarding the data packet to the final destination node. A Euclidean distance refers to the spatial distance between the two nodes, whereas a GPS-based distance may be derived from the GPS positions of the sender node, the destination node and/or the intermediate node. For instance, the traveled distance may be determined as the distance between the GPS positions of the sender node and the intermediate node. Alternatively, the traveled distance can be determined using a distance to be traveled, i.e. the distance between sender node and destination node, and the distance between the intermediate node and the destination node, determined from the respective GPS positions of the intermediate node and the destination node. The metric of the distance may be chosen according to a routing protocol applied in the network. If the routing protocol uses a hop count metric, it will be easy to determine the hop distance between two nodes. Likewise, when the network addresses of the nodes are related to their geographic or GPS position, it will be advantageous to use a GPS-based or Euclidian distance to define the distance between the sender node and the intermediate node.

Preferably, the communication functions of the control unit can be sub-divided into different layers. A higher protocol layer of the control unit, e.g. a network layer, transport layer or application layer, may be adapted to consider information available in an underlying lower protocol layer, or the other way around. For instance, the network layer may use parameters determined by the medium access control (MAC) layer. By means of this cross-layer communication, the system becomes more reliable and flexible. For instance, the distance information related to the distance traveled by the data packet may be provided from a lower protocol layer to a higher protocol layer by cross-layer communication.

Alternatively or additionally, the distance information may be obtained from a routing table, a hop-counter, a time-to-live counter, a local clock signal, a GPS location and/or a network address of the sender node and/or of the destination node. The routing table or the local clock signal may be stored in the device, whereas the hop-counter, the time-to-live counter and/or information about the sender node may be included in a data packet. Here, the time-to-live counter of a data packet relates to a counter with an initial value relating to a maximum allowed travel time of the data packet. The time-to-live counter is decreased with every hop. When its value is zero, the data packet is dropped. By these means, infinitely traveling data packets, which cannot be delivered, are avoided. Thus, an intermediate node may determine the distance based on information included in the data packet or stored locally in the node, in order to adjust transmission parameters for a data packet to be forwarded. However, a hop count or a time-to-live count may also be stored in the intermediate node for a plurality of sender nodes. Another possibility to determine the distance information is using a difference between an initial time-to-live count and a final time-to-live count. Possibly, the initial time-to-live count is known or equal for all nodes of the system. Additionally or alternatively, the distance information may be derived from techniques for building-up routing tables for the wireless network.

The hop count can be the hop count of the data packet received from the sender node, the average of the last n data packets received from the sender node, the maximum hop count over the last n data packets received from the sender node, a moving average of hop counts of the data packets received from the sender node over time, or the like. Moreover, the transmission parameters may be adjusted based on a type of the data packet to be sent, e.g. whether it is a time-critical or a time-uncritical data packet or what priority rank the data packet has. For this, the control unit of the device may further be able to determine the type of the data packet.

Data packet transmission may be performed by wireless radio-frequency transmissions. Since radio-frequency transmissions do not require high transmission power and are easy to implement and deploy, costs for setting up and operating a network using the device can be reduced. This is especially important for large networks, e.g. a telemanagement network for lighting systems. However, data packet transmission may alternatively use infrared communication, free-space-visible-light communication or powerline communication.

In a preferred embodiment, the device is used in luminaire nodes of a lighting system for telemanagement of luminaire nodes. Thus, the luminaire nodes can be easily switched on/off and/or the diming pattern of the luminaire nodes can be controlled based on parameters, such as daytime, season, weather, ambience brightness, occurrence of traffic accidents, presence of road works, etc. Possibly, at least some of these parameters are determined by sensors provided with the luminaire nodes and reported to a control center.

In a further preferred embodiment, a device for a node of a wireless network is provided for controlling data packet transmission, when the node operates as a sender node. The device comprises a control unit that can adjust an answer time-out based on a distance between the sender node and the destination node. The answer time-out refers to a waiting time, during which a sender node waits for an answer from a destination node B. If the answer time-out has passed and the sender node has received no answer data packet, the sender node will retransmit the data packet, to which the sender node expects to receive the answer. This answer data packet may include an acknowledgement, data or both. In the case that the answer includes an acknowledgment, the answer time-out is called acknowledgement time-out defining a time interval, during which a sender node waits for an acknowledgement indicating successful data packet transmission. When the acknowledgement time-out has passed without the sender node having received an acknowledgement, the sender node will start retransmission of the data packet. By individually adjusting the answer time-out for each pair of sender node and destination node, the delay of detecting a failed transmission is reduced, thus decreasing the end-to-end delay of a successful transmission due to retransmissions close to the minimum possible value. Thus, in a large-scale lighting system, this will further decrease the delay of control commands, so that luminaire nodes will react faster, e.g. to dimming or switching commands.

In another aspect of the present invention, a system is provided for controlling data packet transmission in a wireless network. The system comprises a control center and a plurality of nodes. At least one of the control center and the nodes comprises the device according to one of the above-described embodiments. The control center is adapted to control the function or operation of the nodes in the wireless network. For instance, when the nodes are associated with the luminaires of a lighting system, e.g. a street lighting system, the control center may control the nodes individually and/or in groups based on their spatial distribution with respect to their dimming pattern and operation state. Preferably, at least one of the nodes comprises a memory and/or a sensor. If the node comprises a sensor, the node may be adapted to transmit the sensor data to the control center.

In a further aspect of the present invention, a method is provided for controlling data packet transmission in a wireless mesh network having a plurality of nodes. According to this method, a data packet is received by an intermediate node from a sender node. Then, the transmission parameters for the data packet are adjusted based on a distance between the sender node and the intermediate node and the data packet is processed according to these transmission parameters. Preferably, this method is applied in a telemanagement system for lighting systems.

DETAILED DESCRIPTION

Preferred applications of the present invention are outdoor lighting systems (e.g. for streets, parking and public areas), indoor lighting systems for general area lighting (e.g. for malls, arenas, parking, stations, tunnels etc.) or sensor networks. In the following, the present invention will be explained further using the example of an outdoor lighting system for street illumination. In the field of lighting control, the telemanagement of outdoor luminaires via radio-frequency network technologies is receiving increasing interest, in particular solutions with applicability for large-scale installations with segments of say above 200 luminaires.

Figure 1:
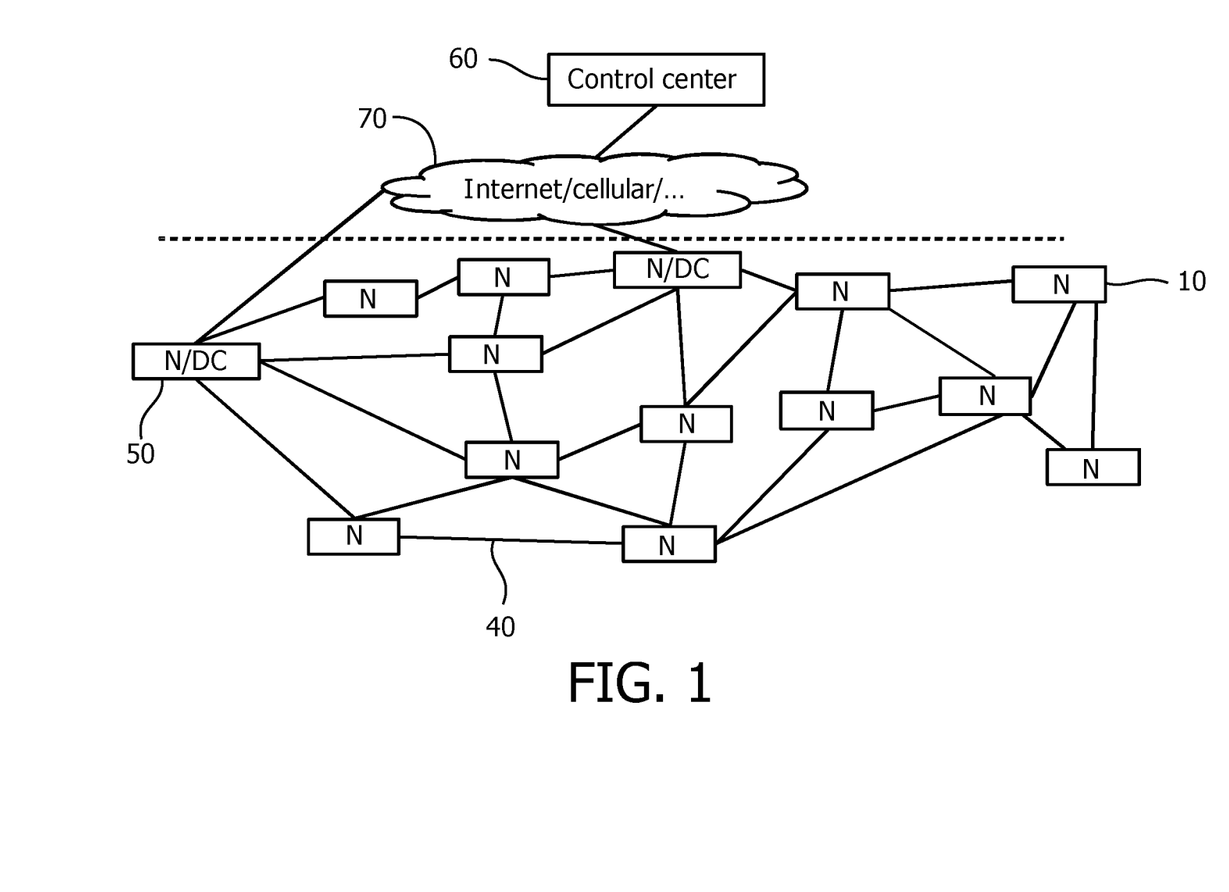
FIG. 1 shows an example of a wireless mesh network.

In FIG. 1, a typical network with mesh topology is shown. A plurality of nodes 10 (N) is connected to each other by wireless communication paths 40. Some of the nodes 10 function as data collector nodes 50 (N/DC), which receive data packets from the surrounding nodes 10 via single-hop or multi-hop transmissions and transmit them to a control center 60 and vice versa. Thus, the data collector nodes 50 may operate in the manner of gateways between the nodes 10 and the control center 60. The wireless communication path 40 between the nodes 10 and data collector nodes 50 may be constituted by radio frequency transmissions, while the connection 70 between the data collector nodes 50 and the control center 60 may make use of the Internet, mobile communication networks, radio systems, ethernet, DSL, cable or other wired or wireless data transmission systems.

In a telemanagement system for outdoor lighting control, communication is very asymmetric. Most of the traffic is generated by the nodes 10, e.g. reporting their state, sensor values or power usage to the control center 60. The other traffic consists of control commands from the control center 60 to the different nodes 10, e.g. for adjusting a dimming pattern or switching on/off lamps. Therefore, most traffic is constituted by N-to-1 traffic (unicasts), whereas the traffic from the control center 60 to the nodes 10 consists of 1-to-N traffic, either in unicast, multicast or broadcast mode. Moreover, the number of luminaire nodes 10 is extremely high in an outdoor lighting system such as a street lighting system. Hence, the size of the network is very large, especially when compared to common wireless mesh networks, which typically contain less than 200 nodes. In addition, the nodes 10 have limited processing capabilities due to cost considerations, so that processing and memory resources in the luminaire nodes 10 will be limited. Thus, communication protocols for transmitting data packets between single nodes 10 should consider the limited resources for efficient and fast data packet transmission. Furthermore, compared to other so-called ad-hoc mesh networks, the telemanagement system for an outdoor lighting control network is stationary, i.e. the nodes 10 do not move. Also, all luminaire nodes 10 may be connected to mains power. Consequently, network changes will be mainly due to a changing environment, e.g. due to traffic. Since the nodes 10 are stationary, the physical positions of the nodes 10, for instance GPS coordinates, may be known in the system, enabling geographic or position-based routing. Furthermore, telemanagement of an outdoor lighting system does not require a high data rate. However, there are some scenarios, where a low response time is needed for a certain type of messages or data packets. For instance, when a traffic accident is detected, nodes 10 of the corresponding area can be controlled as to immediately switch to full power.

Due to the specific application properties of an outdoor lighting system as mentioned above, the following features can be applied. The data packet transmission from a data collector node 50 to the respective luminaire nodes 10 can be performed by flooding, wherein all data packets are forwarded by all receiving nodes 10 in the network. The data packet contains at least information about the sender node 10 and one or more destination nodes 10. The data packet is then decoded by the at least one destination node 10. For data packet transmission from the luminaire nodes 10 to the data collector nodes 50, a routing-based solution is preferred, wherein every node 10 selects as intermediate node 10 a neighboring node 10 that is closer to one of the data collector nodes 50. Preferably, a proactive routing structure is used, since the routes to the data collector nodes 50 are regularly used. In the proactive routing structure, a routing table is stored in every node 10, indicating which neighboring node 10 is closer to one of the data collector nodes 50. Thus, data packets can be sent to the closest data collector node 50 in a very efficient and fast way. Advantageously, each node 10 keeps information about multiple downlink neighboring nodes 10 as alternative routes in order to increase reliability. If one neighboring node 10 is not reachable due to strong interference or complete failure, then the routing protocol has additional alternatives to route the data packet to the data collector node 50.

Figure 2A:
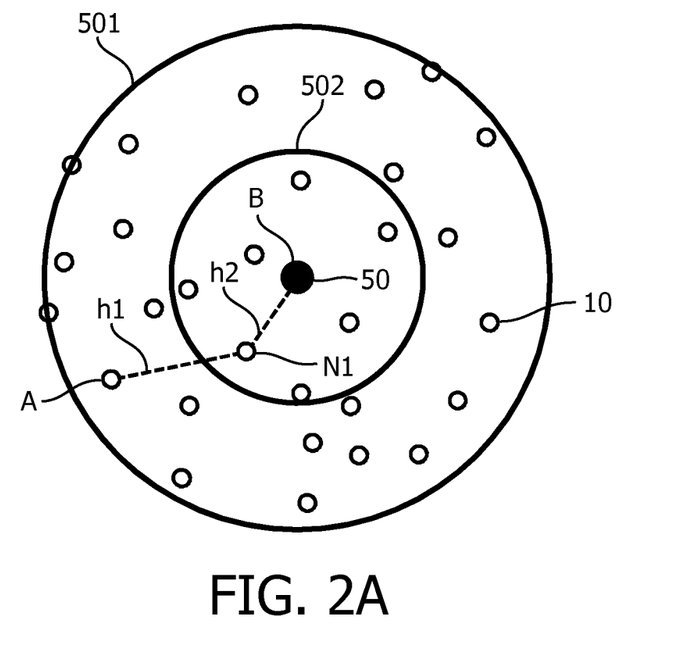
FIG. 2A shows a schematic view of the wireless mesh network illustrating hop distances between nodes.

In FIG. 2A, a data collector node 50 surrounded by a plurality of nodes 10 is shown, illustrating multi-hop unicast data transmission from a sender node A to the data collector node 50 (destination node B) via a plurality of intermediate nodes N1 ... Ni. The nodes 10 have different hop distances to the data collector node 50 as indicated by radius 501 and 502. For instance, a node A within radius 501, but outside radius 502 will need two hops h1 and h2 for transmitting data packets to the data collector node 50 being the destination node B, i.e. a data packet has to be transmitted from this node A to the data collector node 50 via an intermediate node N1. In contrast, a node 10 within radius 502 can transmit its data packets directly in one hop to the data collector node 50. Of course, the destination node B can be any node 10 and is not necessarily a data collector node 50. Thus, a hop distance can be defined for every pair of a sender node A and a destination node B. A parameter for characterizing the hop distance is the hop count, i.e. the number of hops required to transmit the data packet from the sender node A to the destination node B.

Figure 2B:
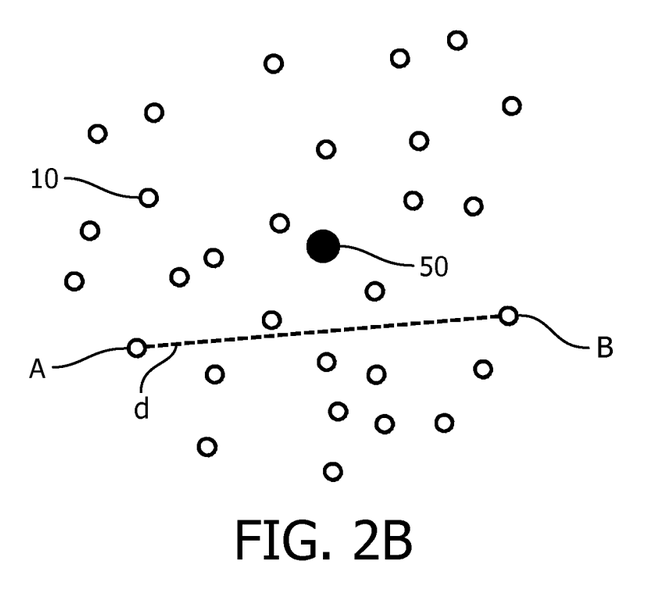
FIG. 2B shows a schematic view of the wireless mesh network illustrating Euclidean distances between nodes.
Figure 3:
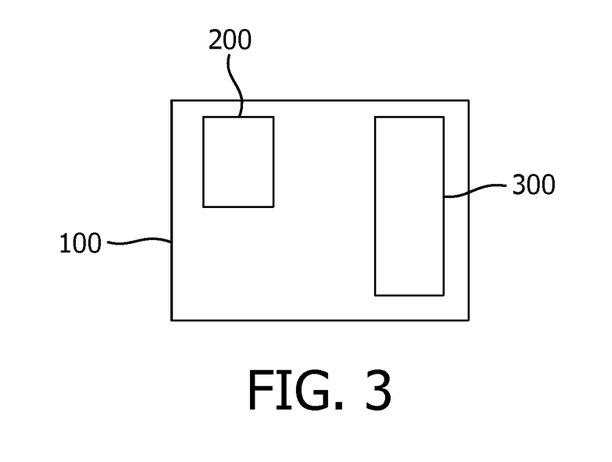
FIG. 3 shows a schematic view of a device according to the present invention.

In FIG. 2B, a Euclidean distance d between the sender node A and the destination node B is illustrated. Between any two nodes 10, the Euclidean distance is defined as the geometric distance between two points. If the network addresses of the nodes 10 are based on GPS positions of the respective nodes 10, also a GPS-based distance may be used. The distance between two nodes 10 is then defined as the distance between their GPS positions. In particular, when the nodes 10 of the network are equally distributed over the network area, a Euclidean or GPS-based distance between two nodes can be characteristic for the number of hops performed on average when transmitting a data packet between two nodes and thus also for the transmission time. Alternatively, the distance can refer to the actual distance traveled by the data packet. In outdoor lighting networks, a distance measured along streets can be used, rather than a Euclidian distance, since data packets will likely travel along these paths. This is illustrated in FIG. 2C, showing street luminaire nodes 10 arranged along streets. Thus, the distance between two luminaire nodes 10 can also refer to a street distance, which is defined as the spatial distance or the hop distance along streets of a road system. In FIG. 3, a device 100 according to the present invention is shown. The device 100 can be associated with a node 10 or data collector node 50 of a wireless multi-hop mesh network, e.g. to luminaires of a lighting system. The device 100 comprises a control unit 200. Moreover, either the node 10 or 50 or the device 100 comprises a transceiving unit 300 for transmitting or receiving data packets via wireless communication paths 40, e.g. via radio-frequency transmission. The control unit 200 of the device 100 may be subdivided into different layers according to its functions in data packet transmission. For instance, when using an OSI-layer model, the control unit 200 will comprise a physical layer for defining the interaction of the device 100 with a transmission medium, a MAC layer providing addressing and channel access control mechanisms in a multi-node network, a network layer providing a plurality of functions and procedures, e.g. network routing functions, a transport layer providing reliable data transfer services to higher protocol layers using e.g. flow control, segmentation/desegmentation or error control and an application layer for identifying communication partners, determining resource availability or synchronizing communication.

In a multi-hop network, any node 10 may act as an intermediate Ni forwarding a received data packet to the next intermediate node Ni or to the final destination node B. When a long-traveled data packet is dropped at an intermediate node Ni, the data packet will have to be retransmitted by its sender node A (end-to-end retransmission), which at least doubles the accumulated end-to-end delay and the spending of network resources, i.e. system bandwidth. Therefore, according to one embodiment of the present invention, it is suggested that transmission parameters for processing a data packet to be forwarded are adjusted in an intermediate node Ni based on a traveled distance of the data packet.

Figure 4:
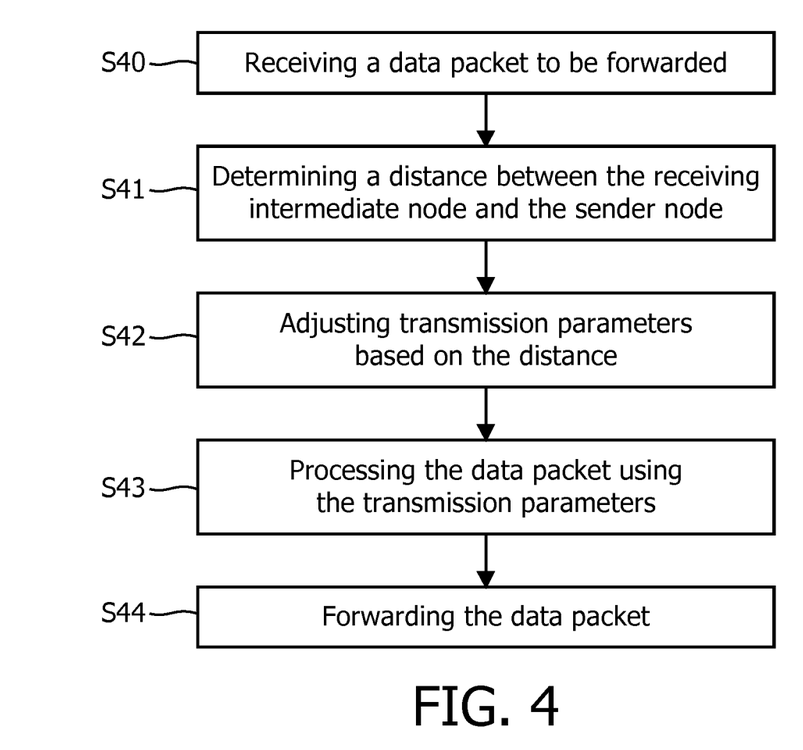
FIG. 4 shows a flow diagram illustrating an embodiment of the present invention.

In FIG. 4, a flow diagram is shown, illustrating the adjustment of transmission parameters for a data packet to be forwarded. In step S40, a data packet is received at the intermediate node Ni, either from the sender node A or from another intermediate node Ni. After having received the data packet, the distance between the receiving intermediate node Ni and the sender node A is determined (S41). Based on this distance, the transmission parameters for the data packet are adjusted (S42) and the data packet is processed using these transmission parameters (S43). This may for instance influence an order of a data packet queue, a priority rank parameter, etc., so that a long-traveled data packet may be processed faster. Then, the data packet is forwarded to the next node 10 (S44) using the determined transmission parameters.

The transmission parameters can refer to MAC parameters, e.g. a maximum number of MAC-layer retransmissions, a maximum number of channel access attempts, a transmit power level, a delay time for retransmission or a back-off time interval for channel access, or a combination thereof. The maximum number of MAC-layer retransmissions determines how often the MAC layer is allowed to retry the transmission of a data packet. Likewise, the maximum number of channel access attempts relates to the maximum allowed number of times that a MAC layer is allowed to perform carrier sensing in order to get channel access for transmitting a data packet. The transmit power level refers to the transmission energy used for the data packet to be forwarded and is thus strongly related to the signal strength of the data packet. The delay time for retransmission denotes a delay between subsequent transmission attempts of a data packet and the back-off time interval for channel access refers to a time interval between two subsequent channel access attempts. Thus, the transmission parameters can be adjusted such, that a probability for a long-traveled data packet to successfully pass the final hops to its destination is increased. For instance, the maximum number of MAC layer retransmissions or the maximum number of channel access attempts or the transmit power level can be increased or the delay time for retransmission or the back-off time interval for channel access can be reduced. Of course, also a combination of these adjustments can be chosen. By these means, the success rate for long-traveled data packets that have already used a lot of network bandwidth can be increased and the total communication delay for long routes can be decreased, possibly at the expense of shorter travelled data packets. Consequently, there is further an inherent homogenization of the end-to-end communication delay.

The intermediate node Ni can determine the distance traveled by the data packet based on local information stored in the intermediate node or on information included in the data packet. The distance between two nodes can be defined using a metric, such as a hop distance, a GPS-based distance or a Euclidean distance. In case that the positions of the nodes 10 are known or that the network addresses are based on GPS positions of the respective nodes 10, the distance information can be derived therefrom. Alternatively, the distance can be derived based on a hop distance between the sender node A and the intermediate node Ni. The hop distance is characterized by the number of hops (hop count) a data packet has traveled from the sender node A. In some cases, the hop distance information is already available at a network layer, e.g. when using routing tables with hop count metric. In this case, sender nodes A together with the respective distances from the intermediate node Ni are stored in the intermediate node Ni.

The distance information can also be explicitly generated, e.g. by the network layer, using a hop counter or a time-to-live counter included in a data packet. The hop counter included in the data packet is increased every hop during the multi-hop transmission from the sender node A to the destination node B. The intermediate node Ni may then derive the hop distance information from the hop counter, i.e. a hop count. Here, the hop count can also relate to the mean or average hop count over the last n data packets received from the sender node A. Alternatively, the hop count may be chosen as the maximum hop count of the last n data packets received from sender node A or as a sliding-window-average of hop counts of the last n data packets over time. The hop count information can be stored at the network layer for determining the hop distance for this sender node A.

Similarly, a time-to-live counter can be used. In general, the time-to-live counter (TTL) is a header field with an initial value that is greater than the maximum required number of hops. At each intermediate node Ni, i.e. after each hop, the time-to-live counter is decreased. Data packets with a current time-to-live counter of zero will be dropped in order to avoid infinite forwarding of undeliverable data packets. Thus, a hop count can be derived from the difference between an initial time-to-live count before the first hop and a final time-to-live count when receiving the data packet. Here, the intermediate node Ni either knows the initial value of the time-to-live counter or the initial time-to-live count is embedded in the data packet. Alternatively, a local clock signal of the intermediate node may be used as a reference to be compared with a start time or transmission time stamp, which indicates the start of the transmission at the sender node A. By these means, a travel time can be derived and thus, when using an average transmission speed, also the distance traveled by the data packet. Of course, distance information and in particular, hop count information can also be generated by the use of other techniques for building-up routing tables, e.g. by regularly sending beacon messages.

Thus, an intermediate node Ni can identify a distance traveled by a data packet, e.g. on the basis of a hop counter or of a sender address included in the data packet. Long-traveled data packets exhibit high hop count values or a large difference between the GPS positions of the sender node A (e.g. indicated in the sender address field) and of the intermediate node Ni (at least known locally to the intermediate node Ni). Alternatively, the distance to be traveled, i.e. the distance between the sender node A and the destination node B, may be included in the data packet. Using the locally known distance between the intermediate node Ni and the destination node B, the distance traveled can be calculated as the distance between the sender node A and the destination node B minus the distance between the intermediate node Ni and the destination node B. Hence, when prioritizing such a long-traveled data packet by using favorable transmission parameters, the end-to-end delay can be decreased close to the minimum possible value and homogenized over the network. Moreover, when the travel distance is determined anew for each received data packet that is to be forwarded, the adjustment of the transmission parameters is applicable to dynamic routing protocols, wherein the number of hops from a certain sender node A can vary.

In one example, at least two sets of transmission parameters are stored in the intermediate node Ni, one relating to normal processing or forwarding of a data packet, the other relating to privileged processing or forwarding. When it is determined that the distance that a data packet has traveled exceeds a certain threshold, the preferential transmission parameters for the hop of the data package to the next node 10 are chosen. This can for example be indicated by setting a flag in the data packet. Of course, the transmission parameters can also be adjusted in more than two levels. Alternatively, the adjustment of the transmission parameters may be proportional to the distance traveled by the data packet. Furthermore, a type of the data packet may be determined as additional parameter influencing the adjustment of the transmission parameters. For instance, the transmission parameters for long-traveled time-critical data packets may be adjusted to more favorable transmission parameters that particularly accelerate the processing and the transmission than shorter traveled time-uncritical data packets. Possibly, even a priority rank included in the data packet may be considered for the adjustment of the transmission parameters. Consequently, long-traveled data packets are more likely than shorter traveled data packets to successfully hop to the next node 10. This may even occur at the expense of short-traveled data packets and thereby result in delay homogenization.

When applied in the telemanagement of an outdoor lighting system, this achieves an increased synchronization of the luminaire nodes 10, since the luminaire nodes 10 will receive instructions with comparable delays. Moreover, the mean and the maximum communication delay for luminaire nodes 10 that are far away from any data collector node 50 (or the control center 60) are decreased, resulting in a higher communication delay homogeneity for luminaire nodes 10 in the same network.

Figure 5:
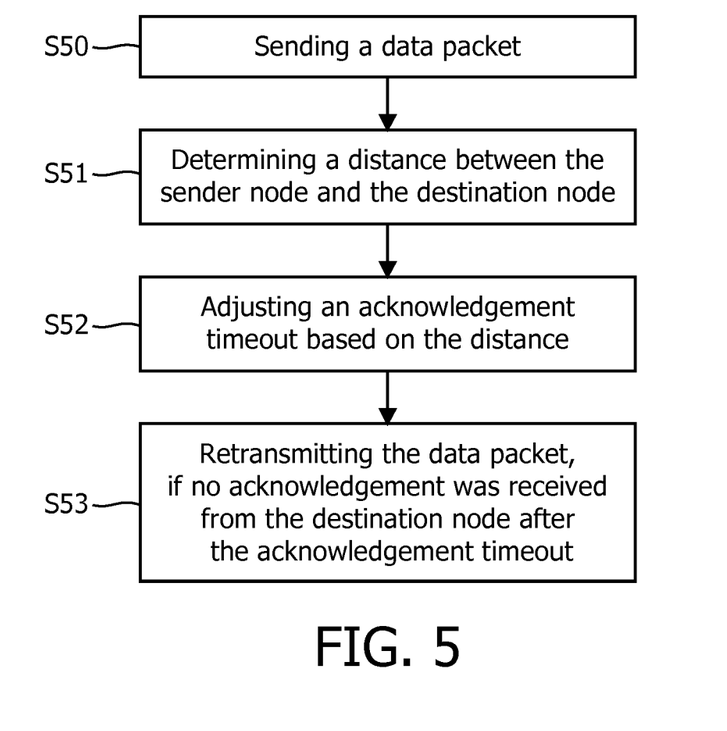
FIG. 5 shows a flow diagram illustrating a further embodiment of the present invention.

Another reason for increased end-to-end communication delays are unnecessary delays between end-to-end retransmissions in case of a failed transmission. In general, the answer time-out should take a value as small as possible in order to minimize the end-to-end communication delay. The answer time-out refers to the time period, for which any sender node A waits for an answer for the sent data packet from the destination node B before retransmitting the data packet. The answer may include an acknowledgement indicating successful transmission of the data packet sent by the sender node A or data requested by the sender node A or both. If the answer includes an acknowledgement, the answer time-out is also referred to acknowledgement time-out. In the prior art, the acknowledgement time-out is fixed and common for all nodes 10. Hence, the communication delay for closely neighbored nodes 10 is equal to the one for distant nodes 10, possibly resulting in unnecessary delays of data packet retransmissions. Therefore, according to a further embodiment of the present invention, the answer time-out for a data packet is adjusted based on a distance to be traveled by the data packet, i.e. the distance between the sender node A and the destination node B, as illustrated in FIG. 5 using the example of adjusting an acknowledgement time-out. When processing a data packet to be sent or when sending a data packet (S50), the distance between the sender node A and the destination node B is determined (S51). Based on this distance, the acknowledgement time-out for this data packet is adjusted (S52). Possibly, the priority of the data packet is also taken into account. Therefore, the transport/application layer retransmission in case of a missing acknowledgement is scheduled accordingly. When adjusting the acknowledgement time-out for each individual sender-destination-combination, as suggested by the present invention, the acknowledgement time-out of a sender node A can be optimized, thus minimizing the end-to-end communication delay. The minimum value of the acknowledgement time-out equals the expected or average roundtrip time for a data packet transmission between the source node and the destination node, i.e. the time for delivery of the data packet plus the time for delivery of the acknowledgement. Alternatively, the minimum value of the answer time-out can be set to the minimum value of the roundtrip time or the like. When the sender node A does not receive an acknowledgement for the sent data packet within the acknowledgement time-out, the sender node A will retransmit the data packet (S53). The order of the steps may be changed, i.e. steps S51 and/or S52 can be performed before sending the data packet (S50).

The sender node A can determine the distance to the destination node B either from data stored in the sender node A, e.g. a routing table, a list of distances to potential destination nodes, distance information received before from the destination node B or the like. When a hop counter or a time-to-live counter is included in the data packets, the sender node A may determine the distance to the destination node B from a hop counter or a time-to-live counter included in a data packet received from the destination node B. Thus, the hop count derived from a data packet or the mean or maximum hop count derived from the last n data packets received from destination node B may be used for the reverse path.

When choosing a hop count metric, the acknowledgement time-out can be calculated as: time_out=2*constant*hop_count*hop_time, with the constant being greater than 1. The factor 2 is for the round trip, since the hop count only relates to one way. Alternatively, a hop count for the round trip may be used instead. Hence, the acknowledgement time-out is greater than or equal to the average roundtrip time. The hop_time can relate to an average time period required on average for forwarding a data packet to the next intermediate node Ni in a multi-hop transmission. This may be characteristic for the network. Again, the hop time may depend on the type of the data packet, e.g. whether the data packet is a time-critical or time-uncritical data packet or whether the data packet is labeled with high or low priority. Of course, the hop_time can also be replaced with other characteristic times, for instance a medium hop time or a success hop time, i.e. a time interval, in which a certain percentage, e.g. 90%-99% of the hops are successfully taken.

When using a GPS-based or Euclidean distance, the acknowledgement time-out is similarly calculated using a characteristic time for the chosen metric.

It is also possible to take into account some delay in the destination node B for adjusting the answer time-out, e.g. a buffer time the response data packet is buffered there, a turn-around time from the destination node B to the sender node A, or the like.

Preferably, the answer time-out can additionally be based on a current traffic load in the network, which will result in a higher hop time. This can be determined e.g. by an amount of network traffic observed or received by the sender node A, or by how many packets the sender node A sent out in the last time period T. Alternatively, the receiver node B (or any of the intermediate nodes Ni) can report information about a network load to the sender node A, e.g. as part of a data packet or together with an acknowledgement. Also, when transmission parameters are adjusted based on a traveled distance of a data packet, this can be additionally considered for the adjustment of the answer time-out.

Adjusting the transmission parameters or the answer time-out is not only applicable to unicast data packets sent to only one destination node B. The embodiment can also be applied in broadcast and multicast cases, wherein a data packet is transmitted to several destination nodes B. In these cases, different sets of transmission parameters or different answer time-outs for different destination nodes B in a multicast group can be taken into account, e.g. the maximum acknowledgement time-out for the nodes in the group is selected.

When applied in a large lighting system with a plurality of luminaire nodes 10, the delay for operation commands can thus be minimized. In particular, for luminaire nodes 10 that are far away from a data collector node 50 (or a control center 60) sending the operation command and that have long transmission times already, this eliminates unnecessary communication delay between retransmissions of unacknowledged data packets. Therefore, the scalability of the lighting system can be further increased and response times of the luminaire nodes 10 can be decreased.

Hence, according to the present invention, when the node 10 acts as an intermediate node Ni forwarding a received data packet, the transmission parameters of the intermediate node Ni can be adjusted for the data packet based on the distance travelled by this data packet. By these means, the survival chance of long-travelled data packets is increased, thus reducing the end-to-end communication delay. Moreover, data packets perceive comparable delays irrespective of the required number of hops, which is beneficial for an application and also for a transport layer. This is in particular useful, if data packets have to be retransmitted at higher layers in case of data packet loss. Hence, a reduced mean and maximum delay can be achieved as well as higher delay homogeneity in the network. In addition, when the node 10 operates as a sender node A, the answer time-out can be adjusted for each individual pair of sender node A and destination node B, further reducing the end-to-end transmission delay in a wireless network. Thus, overall network resources can be saved.

The invention claimed is:

1. A device for controlling data packet transmissions in a wireless network having a plurality of nodes, comprising:
   a control unit that is adapted to adjust transmission parameters of an intermediate node (Ni) for forwarding a data packet received by the intermediate node (Ni) based on a distance between the intermediate node (Ni) and a sender node (A) travelled by the data packet, characterized in that the transmission parameters are set to preferential transmission parameters for the data packet, if it is determined that the distance travelled by the data packet exceeds a predetermined threshold.

2. The device according to claim 1, wherein the device is adapted to be coupled to a node and/or to a data collector node and/or wherein the wireless network is a mesh network and/or wherein nodes of the wireless network are stationary and/or positions of nodes of the wireless network are known and/or wherein a data packet transmission from the sender node (A) to a destination node (B) is performed in a multi-hop mode via a plurality of intermediate nodes (Ni).

3. The device according to claim 1, wherein the distance between two nodes is defined by a hop distance, a GPS-based and/or Euclidean distance.

4. The device according to claim 1, wherein the transmission parameters comprise at least one of a maximum number of retransmissions at a lower layer, a maximum number of medium access attempts, a transmit power level, a delay time for retransmission and a back-off time for medium access attempts.

5. The device according to claim 1, wherein the transmission parameters are adjusted continuously depending on the distance travelled by the data packet and/or wherein the transmission parameters are adjusted depending on a type of the data packet.

6. The device according to claim 1, wherein the transmission parameters are adjusted so that a transmission probability of data packets having travelled a distance exceeding a predetermined threshold is increased.

7. The device according to claim 1, wherein the distance travelled by the data packet is derived from a hop counter, a time-to-live counter, a routing table, an information included in the data packet, a GPS location of the sender node (A) and/or a network address of the sender node (A).

8. The device according to claim 1, wherein a distance information is provided from a lower layer to an upper layer by cross-layer communication.

9. The device according to claim 1, wherein a distance information is generated by using a difference between an initial time-to-live count and a final time-to-live count of the data packet and/or by using techniques for building up routing tables.

10. The device according to claim 7, wherein a hop count corresponds to a hop count of a last received data packet from the sender node (A), an average hop count over the last n data packets received data packet from the sender node (A), a maximum hop count over the last n data packets received data packet from the sender node (A) and/or a sliding window average of hop counts of data packets received data packet from the sender node (A) over time.

11. The device according to claim 1, wherein the device is used in telemanagement of a lighting system for switching on/off and/or controlling dimming patterns of luminaire nodes, and/or reporting sensor data and/or luminaire status.

12. The device according to claim 1, wherein the control unit is further adapted, when the device is acting as the sender node (A), to adjust an answer time-out for a data packet to be sent based on a distance from a sender node (A) to a destination node (B).

13. A system for controlling data packet transmissions in a wireless network, the system comprising:
    a control centre; and
    a plurality of nodes, at least some of them including a device for controlling data packet transmissions in a wireless network having a plurality of nodes, having a control unit that is adapted to adjust transmission parameters of an intermediate node (Ni) for forwarding a data packet received by the intermediate node (Ni) based on a distance between the intermediate node (Ni) and a sender node (A) travelled by the data packet, wherein the transmission parameters are set to preferential transmission parameters for the data packet, if it is determined that the distance travelled by the data packet exceeds a predetermined threshold; and
    wherein data packets are transmitted from a sender node (A) to a destination node via intermediate nodes (Ni) by multi-hop transmissions in the wireless network.

14. The system according to claim 13, wherein the nodes are associated with luminaires of a lighting system.

15. A method for controlling data packet transmissions in a wireless network having a plurality of nodes, the method comprising:
    receiving a data packet at an intermediate node (Ni);
    adjusting transmission parameters based on a distance between a sender node (A) and the intermediate node (Ni) travelled by the data packet;
    processing the data packet based on the adjusted transmission parameters, and
    forwarding the data packet, characterized in that the transmission parameters are set to preferential transmission parameters for the data packet, if it is determined that the distance travelled by the data packet exceeds a predetermined threshold.

* * * * *